United States Patent [19]
Morse et al.

[11] 3,734,742
[45] May 22, 1973

[54] STABILIZED BEVERAGES

[75] Inventors: Lewis D. Morse, Princeton; Paul A. Hammes, Westfield, both of N.J.

[73] Assignee: Merck & Co., Inc., Rahway, N.J.

[22] Filed: Dec. 8, 1971

[21] Appl. No.: 206,128

Related U.S. Application Data

[63] Continuation-in-part of Ser. No. 30,978, April 22, 1970, abandoned.

[52] U.S. Cl. ..........................99/28, 99/11, 99/105, 99/155, 424/147, 424/280, 424/295
[51] Int. Cl. ................................................A23l 1/30
[58] Field of Search ..............99/28, 11, 105, 140 R, 99/63, 54, 155, 186, DIG. 1; 424/147, 280, 295

[56] References Cited

UNITED STATES PATENTS

| | | | |
|---|---|---|---|
| 3,174,866 | 3/1965 | Saperstein | 99/54 |
| 2,822,317 | 2/1958 | Gulesich et al. | 424/280 |
| 2,939,820 | 6/1960 | Gerber et al. | 424/280 |
| 3,080,234 | 3/1963 | Jarowski | 99/14 |

OTHER PUBLICATIONS

Esselen et al., Fortification of Fruit Juices With Ascorbic Acid, Fruit Prod. Jour. & Amer. Food Mfg., 9/1946, Vol. 26, No. 1, pp. 11–14, 29

Uprety et al., Stabilization of Vit. in Pharm. Prep. Part III, J. Sci. Industr. Res., Vol. 196, 12/1960, pp. 302–305

National Research Council, Chem. Used in Food Processing, 1965, pp. 57, 58

Furia, Handbook of Food Additives, 1969, pp. 128–129

*Primary Examiner*—Morris O. Wolk
*Assistant Examiner*—Stephen B. Davis
*Attorney*—Francis H. Deef, Harry E. Westlake, Jr. and I. Louis Wolk

[57] ABSTRACT

A sealed canned or bottled aqueous beverage containing at least about 80 percent water and having a pH of from 2.0 to 3.4, an ascorbic acid content of from 0.056 to 1.120 mg./ml. and a ferrous ion content of from 0.008 to 0.15 mg./ml.

3 Claims, No Drawings

STABILIZED BEVERAGES

This application is a continuation-in-part of U.S. Ser. No. 30,978 filed Apr. 22, 1970 now abandoned.

This invention relates to bottled and canned beverages and particularly to vegetable and fruit drinks and to the so-called soft drinks. The invention also relates to canned fruit beverages and fruit drink mixtures as well as to canned vegetable beverages. The feature of the invention is the inclusion in them of both ascorbic acid and iron as a stable preparation.

Iron is an essential nutrient. It is an integral part of the structure and functions of several enzymes and of hemoglobin. The National Academy of Sciences reported in its Publication No. 1694 on Recommended Dietary Allowances that it is impractical to supply in an otherwise adequate diet the iron needs of the population particularly women, infants and children. They observe that "it is desirable to increase the iron content of the diet through fortification".

Ascorbic acid (Vitamin C) is one of the most essential vitamins as humans cannot synthesize it and it consequently must be consumed. Moreover, as the body cannot store it, a daily intake of an adequate amount is essential. This is not accomplished with the average daily diet unless a special effort is made to eat citrus foods and others which have a high Vitamin C content.

Ascorbic acid is stable in the dry condition. In aqueous solution, however, it is rapidly oxidized by oxygen from the air. The initial oxidation product is dehydroascorbic acid and this is further oxidized (with a loss of Vitamin C activity) to degradation products. Iron is known, along with copper and other metals, to catalyze oxidation of ascorbic acid so that a liquid product containing ascorbic acid and iron in its conventional ferric ion salt form becomes useless very rapidly.

Consequently, food scientists and nutritionists would like to increase the present day average consumption of iron and ascorbic acid. As soft drink beverages may be consumed several times daily by many people, bottled or canned beverages offer an ideal carrier to supply an increased amount of iron and ascorbic acid. Although canned fruit and vegetable beverages may not be consumed every day, they also offer an excellent means for giving additional ascorbic acid and iron to the consumer.

Until the present invention, the addition of ascorbic acid and iron to beverages has not been considered feasible and the reason for this is a great deal of literature describing the catalytic effects of iron on the oxidative deterioration of ascorbic acid. Thus, one does not find bottled or canned soft drinks or fruit or vegetable beverages fortified with both ascorbic acid and iron.

This invention results from the surprising discovery that ferrous ion does not decrease the stability of ascorbic acid in the usual bottled or canned fruit, vegetable and soft drink preparations despite all the flavoring, acidifying and other agents which are ordinarily present. This is in marked contrast to the ferric form. Thus, an anaerobic system, i.e. a canned or bottled system with a small headspace demonstrates the utility of ferrous ion as an additive in the presence of ascorbic acid. This invention therefore is of value to canners and bottlers who now enrich and fortify a variety of products with Vitamin C. With the findings of this invention, iron can now also be included in these packaged goods as the ascorbic acid will remain substantially unimpaired during storage. Once opened they are consumed rather quickly and before any substantial nutrient deterioration has occurred.

Aqueous medicines have been made which include ascorbic acid and ferrous iron but because they are medicines many people are somewhat reluctant to consume them. The need to take a medicine or pharmaceutical of any kind creates a feeling of physical weakness in people that is contrary to their basic desire to be robust individuals. Medicines are always consumed in teaspoon or tablespoon amounts and this adds to the inherent feeling that something is possibly wrong with the consumer's health as otherwise there would be no need for a daily administration of the medicine.

This is not true of bottled and canned fruit beverages, vegetable beverages and soft drinks as they are always consumed with relish as they are refreshing. Medicines and beverages are so nonanalogous in nature that the practices in the pharmaceutical art are not carried over into the beverage art. For this reason, the lack of bottled or canned goods of any kind, i.e. vegetable, fruit or soft drink beverages, containing both iron and ascorbic acid is due to its unobvious nature over medicines.

The objects of the present invention are accomplished by providing a sealed canned or bottle aqueous beverage containing at least about 80 percent water and having a pH of from 2.0 to 3.4, an ascorbic acid content of from 0.056 to 1.120 mg./ml. and a ferrous ion content of from 0.008 to 0.15 mg./ml.

In a preferred embodiment of the present invention, the beverage contains from 80 to 95 percent water and has a pH of from 2.5 to 3.4, an ascorbic acid content of from 0.112 to 0.840 mg./ml. and a ferrous ion content of from 0.011 to 0.062 mg./ml. In a still more preferred embodiment of the present invention, the beverage contains from 85 to 92% water and has a pH of from 2.8 to 3.35, an ascorbic acid content of from 0.140 to 0.672 mg./ml. and a ferrous ion content of from 0.014 to 0.051 mg./ml.

The present invention in its broadest aspect therefore provides from about 9 to about 200 mg. of Vitamin C and from about 1.4 to about 26 mg. of ferrous ion per 6 oz. of beverage. In the preferred embodiment of the present invention, the beverage provides from about 19 to about 150 mg. of Vitamin C and from about 1.9 to about 11 mg. of ferrous ion per 6 oz. drink of beverage. In the even more preferred embodiment of the present invention, the beverage provides from about 24 to about 120 mg. of Vitamin C and from about 2.4 to about 9 mg. of ferrous ion per 6 oz. of beverage.

In practicing the invention, it is preferable to use ferrous sulfate heptahydrate as it is commercially obtainable at a low price but its monohydrate or the anhydrous form may be used as well. It is also possible to use ferrous-fumerate, -citrate, -lactate and the other salt forms which are used medicinally to treat anemia. If ferrous sulfate heptahydrate or other salt is selected, it is weighed out so that its elemental iron content is in the range of 0.008 to 0.150 mg./ml. of the bottled or canned preparation. As this is based on the ferrous ion present, it determines the equivalent weight required for whatever ferrous salt is selected.

In carrying out the present invention, it is desirable to add the Vitamin C and ferrous ion to the beverage and then to seal (i.e. exclude outside air) the can or bottle as soon as is practical. Since the oxygen in the air tends to oxidize Vitamin C in dilute solutions, the contact of the beverage with air reduces the Vitamin C content. Furthermore, in the conventional canning and bottling procedures, a small headspace of air (with oxygen) is left in the bottle or can which also oxidizes the Vitamin C. Accordingly, after bottling or canning, the Vitamin C continues to be oxidized until the oxygen in the headspace is used up. While an inert gas may be used in the headspace to avoid oxidation, the inert gas is generally not employed due to the increased cost of the bottling operation. After the oxygen in the headspace is used up, the beverage becomes quite stable with less than a 20 percent decrease in Vitamin C over a period of one month. Accordingly, the sealed canned or bottled beverage of the present invention has a shelf life of many months.

The following examples are given to illustrate the invention and are not intended to limit it in any way. All parts are given in parts by weight unless otherwise expressed.

EXAMPLE 1

An experimental aqueous solution is prepared to contain 3.25 mg. of citric acid per ml., 0.338 mg. ascorbic acid per ml. along with ferrous ion as ferrous fumarate, at 0.10 mg. $FE^{++}$/ml. The control is prepared to contain the citric acid and ascorbic acid only in the same amounts. 200 Ml. solutions are prepared in 200 ml. volumetric flasks. 20 Ml. of the solutions are then removed from each flask to provide a small air space. The flasks and contents are heated to 90°C. in a water bath for one minute and then cooled in ice water. The flasks are then stoppered and stored for testing. After 4 hours, 1 week and 3 weeks at room temperature, the results of the analyses for ascorbic acid are shown below. In each case, the water content is 99.6 percent.

ASCORBIC ACID (MG./ML.)

|  | "Initial" (4Hrs.) | 1 Week | 3 Weeks |
|---|---|---|---|
| Control | 0.32800 (pH 3.15) | 0.05430 (pH 3.00) | 0.00121 (pH 3.01) |
| Experimental | 0.31300 (pH 3.20) | 0.13600 (pH 3.10) | 0.02190 (pH 3.10) |

EXAMPLE 2

A commercially available lemon still beverage is treated in several ways. One portion (I) is fortified with Vitamin C at 0.339 mg./ml. beverage. Another portion (II) is fortified with Vitamin C at 0.339 mg./ml. and with ferrous iron (as ferrous sulfate) at 0.062 mg./ml Another portion (III) is fortified with Vitamin C at 0.339 mg./ml. and with ferrous ion at 0.021 mg./ml. The drinks are pasteurized by heating in a coil at 190°F. for 20 seconds. 12 Oz. cans are then filled within 20 seconds at that temperature and the cans are sealed and allowed to cool in an inverted position. In each case, the water content is 88 percent. Some cans are stored for 2 months at room temperature and some for 44 days at 38°C. The contents of the cans are analyzed for total Vitamin C (total ascorbic acid and dehydroascorbic acid — both biologically available as Vitamin C) and checked for color change and taste. No color or taste differences are observed. Total Vitamin C analyses are as follows:

VITAMIN C (MG./ML.)

|  | pH | 2 Mos. at Room Temp. | 44 Days at 38°C. |
|---|---|---|---|
| I | 3.0 | 0.265 | 0.280 |
| II | 2.95 | 0.350 | 0.360 |
| III | 2.95 | 0.296 | 0.286 |

The above procedure is repeated utilizing Vitamin C at 0.339 mg./ml. and ferrous ion at 0.062 mg./ml. but the cans are not sealed after filling. The cans are allowed to cool at room temPerature and are stored at room temperature for 1 month. Total Vitamin C analysis indicates the presence of less than 0.1 mg./ml. of Vitamin C.

EXAMPLE 3

A commercially available bottled apple juice (85 percent, pH 3.3) is opened and fortified with 0.06 mg./ml. of ferrous ion (as ferrous sulfate) and 0.34 mg./ml. of ascorbic acid, heat sterilized and recanned.

EXAMPLE 4

A commercially available canned grapefruit juice (90 percent water, pH 3.0) is opened and fortified with 0.1 mg./ml. of ferrous ion (as ferrous sulfate) and 1.0 mg./ml. of sodium ascorbate, heat sterilized and recanned.

EXAMPLE 5

A commercially available can of orange juice (90 percent water, pH 3.3) is opened and fortified with 0.06 mg./ml. of ferrous ion (as ferrous sulfate) and 0.34 mg./ml. of ascorbic acid, heat sterilized and recanned.

These examples have applied the invention to previously packaged goods to illustrate the invention but it is intended that the ascorbic acid and ferrous ion be initially applied in the original packaging as well. Other fruit and vegetable beverages may be substituted in the examples.

Many other equivalent modifications will be apparent to those skilled in the art from a reading of the foregoing without a departure from the inventive concept.

What is claimed is:

1. A sealed canned or bottled aqueous beverage containing at least about 80% water and having a pH of from 2.0 to 3.4, an ascorbic acid content of from 0.056 to 1.120 mg./ml. and a ferrous ion content of from 0.008 to 0.15 mg./ml.

2. The beverage of claim 1 containing from 80 to 95% water and having a pH of from 2.5 to 3.4, an ascorbic acid content of from 0.112 to 0.840 mg./ml. and a ferrous ion content of from 0.011 to 0.062 mg./ml.

3. The beverage of claim 1 containing from 85 to 92% water and having a pH of from 2.8 to 3.35, an ascorbic acid content of from 0.140 to 0.672 mg./ml. and a ferrous ion content of from 0.014 to 0.051 mg./ml.

* * * * *